June 24, 1924.

F. ARCHER

VEHICLE WHEEL RIM

Filed July 12, 1923    2 Sheets-Sheet 1

1,498,899

Inventor
FRANK ARCHER

By  Ch. Farbun
Attorney

June 24, 1924.

F. ARCHER

VEHICLE WHEEL RIM

Filed July 12, 1923 — 2 Sheets-Sheet 2

Inventor
FRANK ARCHER

By

Attorney

Patented June 24, 1924.

1,498,899

UNITED STATES PATENT OFFICE.

FRANK ARCHER, OF ERIE, PENNSYLVANIA.

VEHICLE WHEEL RIM.

Application filed July 12, 1923. Serial No. 651,171.

*To all whom it may concern:*

Be it known that I, FRANK ARCHER, a citizen of the United States, residing at Erie, in the county of Erie and State of Pennsylvania, have invented certain new and useful Improvements in Vehicle Wheel Rims, of which the following is a specification.

This invention relates to vehicle wheel rims, and more particularly to rims formed of two or more sections hinged to each other.

An object of the invention is to provide improved means for locking the free ends of the hinged sections of the rim to each other.

A further object is the provision of auxiliary clamping means to secure the free ends of the hinged sections to each other.

Figure 1:
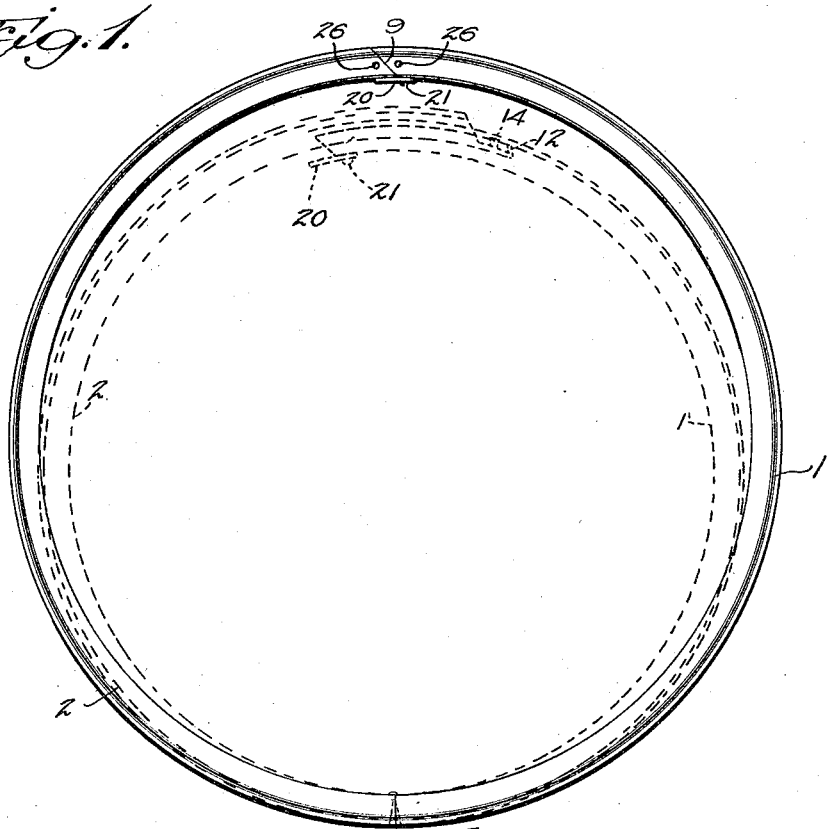
Figures 2, 3:
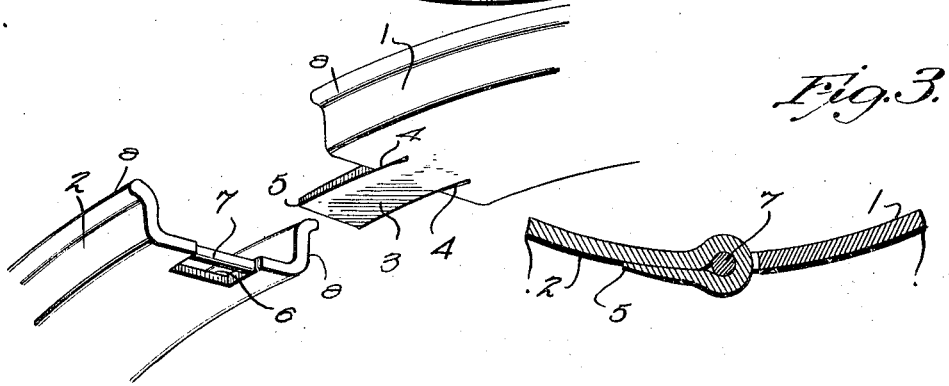
Figure 4:
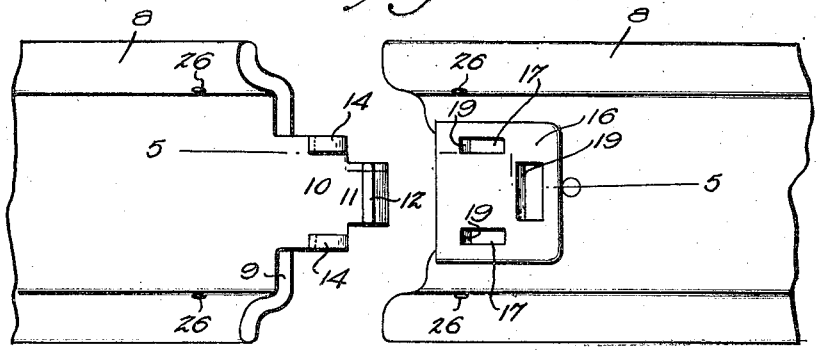
Figure 5:
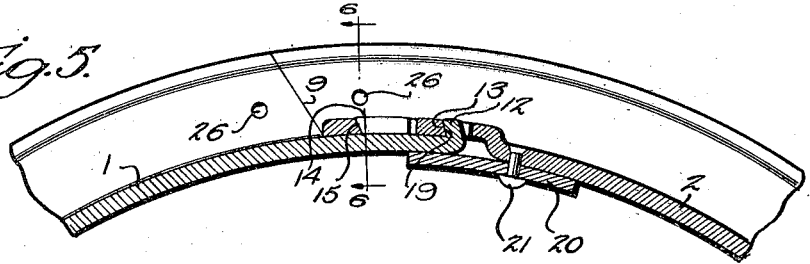
Figure 6:
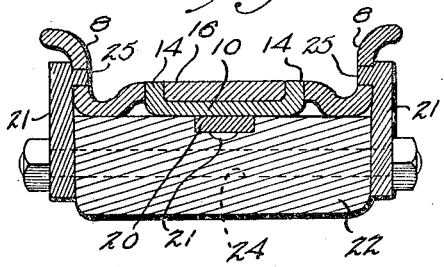
Figure 8:
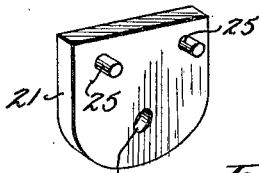
Figure 7:
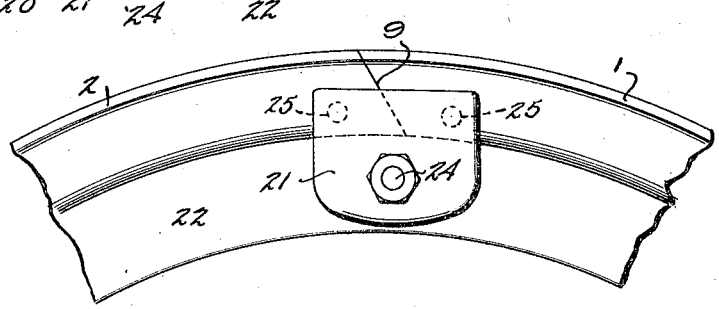

In the accompanying drawings, I have shown one embodiment of the invention. In this showing:

Figure 1 is a side elevation of the rim,

Figure 2 is a perspective view of the ends adapted to be hinged to each other, showing the manner of forming the hinge, Figure 3 is a longitudinal sectional view showing a completed hinge, Figure 4 is a plan view of the free ends of the hinged sections, Figure 5 is a sectional view on line 5—5 of Figure 4, Figure 6 is a transverse sectional view on line 6—6 of Figure 5, Figure 7 is a side elevation of a portion of the rim showing the auxiliary clamping means in position, and, Figure 8 is a detail perspective view of one of the clamps.

Referring to the drawings, the reference numeral 1 designates one section of the rim and 2 the other section. The end of the section 1 of the rim is provided with an extending tongue 3. This tongue is arranged centrally of the base portion, as shown, and extends inwardly beyond the end, being separated from the base portion by slots 4. As shown, the tongue tapers to a substantially pointed end 5. The other section of the rim is provided with a recess 6 at its end and a pin 7 is arranged transversely of the base portion at the front of the recess. As shown in Figure 3 of the drawings, the tongue 3 is curled around the pin 7, forming a hinged connection.

The opposite ends of the rim sections are connected by suitable locking means which may be readily released when the rim is to be collapsed. As shown, each of the rim sections is provided with side flanges 8, and these side flanges are provided with edges formed at an angle forming an inclined joint 9. One of the rims sections is provided with a tongue 10, the end portion 11 of which is of reduced width. This end portion is provided with an upstanding lug 12, having a tapered edge 13. The main portion of the tank is provided with lugs 14 arranged at each side and extending longitudinally. The rear ends of these lugs are tapered or inclined, as at 15.

The other end of the rim is provided with an upwardly offset portion 16 to permit the tongue to be received beneath it, as shown in Figure 5 of the drawings. This offset portion is provided with a pair of longitudinally arranged openings 17, adapted to receive the tongues 14 and a transverse opening 18 adapted to receive the tongue 12. The outer faces of each of these openings is tapered, as at 19, and the openings are slightly larger circumferentially than the circumferential width or length of the lugs 12 or 14, as shown in Figure 5 of the drawings, which permits the lugs to be arranged in the openings and then permits the inclined walls 13 and 15 to engage the inclined faces 19 of the openings and prevent accidental displacement of the tongue. A locking plate 20 is mounted on a pin 21 beneath the offset portion 16 and is adapted to be arranged in an operative position after the tongue has been inserted.

To more securely hold the rim in locked position, I provide auxiliary clamping members 21, adapted to be arranged on opposite sides of the rim and secured to the felly 22. As shown, these members are provided with openings 23, adapted to receive a bolt 24 passing through the felly. These clamping members extend upwardly beside the flanges 8 and are provided with pins 25 adapted to be received in openings 26, formed in the flanges adjacent the ends of each section of the rim.

The operation of the device will be apparent from the foregoing description. To lock the rim, the lugs 12 and 14 are inserted in the openings 17 and 18 and the inclined edges 13 and 15 engage the inclined faces 19 of the openings. The locking member 20 is then placed in operative position and the auxiliary clamping members 21 may be placed on the outside of the rim to retain the rim on the felly and to lock the rim sections to each other.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A vehicle rim comprising a pair of sections hinged to each other, a tongue formed on the free end of one section, a plurality of lugs arranged on said tongue, the other end of the rim being provided with a raised portion adapted to receive said tongue, said raised portion being provided with a plurality of openings adapted to receive said lugs, and a locking member arranged on the inside of said rim and adapted to retain said tongue in position.

2. A vehicle rim comprising a pair of sections hinged to each other at one end, a tongue formed on the free end of one of said sections, a transverse lug formed on the outer end of said tongue, longitudinal lugs formed on the sides of said tongue, the free end of the other section of the rim being provided with a raised portion adapted to receive said tongue, said raised portion being provided with openings for the reception of said lugs, and a locking member arranged on the inside of said rim and adapted to retain said tongue in position.

3. A vehicle rim comprising a pair of sections hinged to each other at one end, a tongue formed on the free end of one of said sections, a plurality of lugs arranged on said tongue, the inner ends of said lugs being inclined, the free end of the other section of the rim being provided with a raised portion adapted to receive said tongue, said raised portion being provided with openings for the reception of said lugs, one wall of each of said openings being inclined to engage the inclined end of said lug, and a locking member arranged on the inside of said rim and adapted to retain said lug in position.

In testimony whereof, I affix my signature in presence of two witnesses.

FRANK ARCHER.

Witnesses:
SAMUEL W. FLEISCHMAN,
FRANK SCALZO.